J. M. WOOD, DEC'D.
S. B. STROTHER, ADMINISTRATOR.
INSULATOR FOR RAILWAY TRUCKS.
APPLICATION FILED DEC. 22, 1908.
957,133.  Patented May 3, 1910.
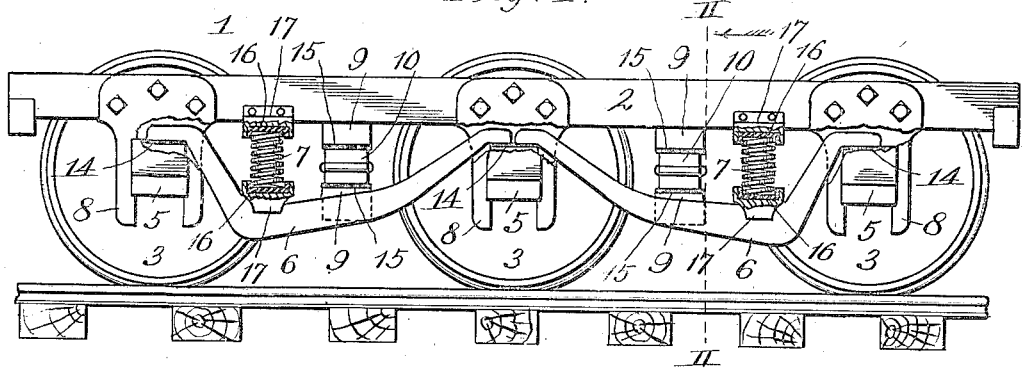
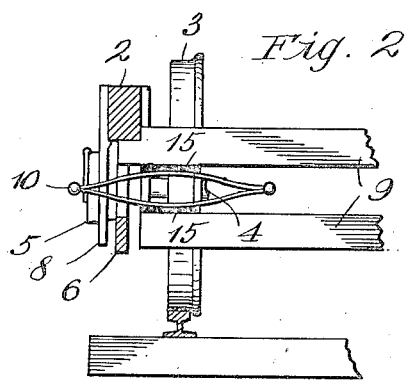
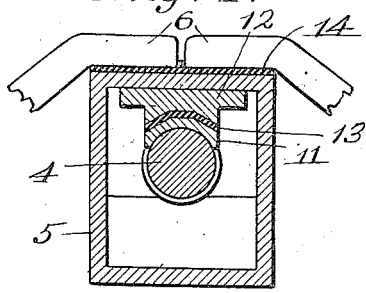
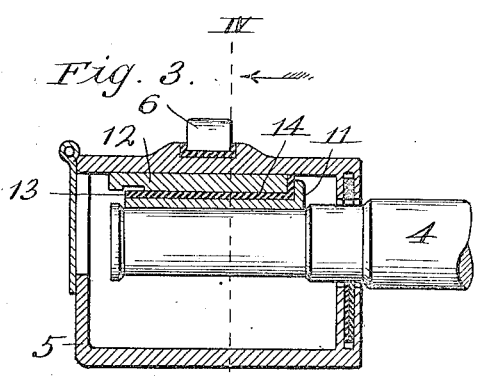
WITNESSES:
R. S. Hamilton
M. Cox
INVENTOR.
James M. Wood,
BY F. G. Fischer
ATTORNEY.

UNITED STATES PATENT OFFICE.

JAMES M. WOOD, OF KANSAS CITY, MISSOURI; SAM B. STROTHER, ADMINISTRATOR OF SAID JAMES M. WOOD, DECEASED, ASSIGNOR TO KATHERINE G. SMITH, OF KANSAS CITY, MISSOURI.

INSULATOR FOR RAILWAY-TRUCKS.

957,133.      Specification of Letters Patent.      Patented May 3, 1910.

Application filed December 22, 1908. Serial No. 468,736.

*To all whom it may concern:*

Be it known that I, JAMES M. WOOD, a citizen of the United States, residing at Kansas City, in the county of Jackson and State of Missouri, have invented certain new and useful Improvements in Insulators for Railway-Trucks, of which the following is a specification.

My invention relates to improvements in insulators for railway trucks, and consists in the construction, combination, and arrangement of parts hereinafter described and pointed out in the claim, and in order that said invention may be fully understood, reference will now be made to the accompanying drawing, in which:

Figure 1 represents a side elevation partly broken away of a six-wheeled car-truck. Fig. 2 is a broken cross section on line II—II of Fig. 1. Fig. 3 is a broken vertical section of one of the journal-boxes of the truck. Fig. 4 is a cross section on line IV—IV of Fig. 3.

1 designates the truck which consists of a rectangular frame 2, a plurality of wheels 3, journals 4 upon which said wheels are fixed, boxes 5 resting upon said journals, equalizers 6 resting upon the boxes 5, coil-springs 7 interposed between frame 2 and the equalizers 6, jaws 8 depending from frame 2 and engaging the sides of boxes 5, bolsters 9 secured to frame 2 and the equalizers 6, and elliptical springs 10 interposed between said bolsters. Boxes 5 are equipped with the customary bearings 11, resting upon journals 4, and wedges 12 interposed between said bearings and the upper inner sides of the boxes, said bearings and wedges having adjacent edges of inverted V-form.

13 designates an insulator of inverted V-form, interposed between the bearing 11 and the wedge 12 of each box, for the purpose of preventing the generation of electrical currents incident to the friction produced between the revolving journal 4 and its bearing 11. Said insulator consists, preferably, of asbestos for absorbing and preventing the transmission of heat from bearing 11 to its box and the adjacent portions of the truck.

In order to render the operation of the truck practically noiseless, and for the purpose of absorbing shocks incident to said truck traveling over rough tracks, I interpose cushions 14 between the tops of boxes 5 and the ends of the equalizers 6, cushions 15 between bolsters 9 and the elliptical springs 10, and cushions 16 between the coil-springs 7 and their sockets 17.

Having thus described my invention, what I claim is:—

In a railway truck, the combination of a journal-box, a journal mounted therein, a bearing for said journal, a wedge for securing said bearing in position, and an inverted V-shaped insulator interposed between said bearing and the wedge.

In testimony whereof I affix my signature, in the presence of two witnesses.

JAMES M. WOOD.

Witnesses:
    F. G. FISCHER,
    M. COX.